UNITED STATES PATENT OFFICE 2,640,827

VITAMIN B₁ GENTISATE

Benjamin Pecherer, Montclair, N. J., assignor to Hoffmann-La Roche Inc., Nutley, N. J., a corporation of New Jersey No Drawing. Application May 21, 1949,
Serial No. 94,733

1 Claim. (Cl. 260—256.6)

The present invention relates to vitamin B₁ gentisate, which can be more particularly identified by the systematic nomenclature 4-methyl-5 - ($\beta$ - hydroxy - ethyl) - N - {[2 - methyl-4 - amino - pyrimidyl - (5)] - methyl} - thiazolium-gentisate-gentisate.

One method for preparing the compound of the invention is disclosed in the following example:

Example 100 grams of Ionac A-300 (an aminotriazine-formaldehyde type anion exchange resin marketed by American Cyanamid Co., New York, N. Y.; cf. U. S. Patent No. 2,251,234) in a column was saturated with gentisic acid by allowing an alcoholic solution of gentisic acid to flow through the column until the effluent pH was approximately 2. The column was then washed free of excess gentisic acid by washing, first with 100 ml. of 50 percent alcohol, then with 100 ml. of water, until the pH of the effluent was 5–6. Following this treatment, 200 ml. of a solution containing 33.7 grams of 4-methyl-5- ($\beta$-hydroxy-ethyl)-N-{[2 - methyl - 4 - amino - pyrimidyl - (5)]-methyl} - thiazolium - chloride - hydrochloride was allowed to flow through the column and the effluent collected until a positive test for chloride ion was obtained.

The effluent was charcoaled, then evaporated to dryness. The crystalline residue was taken up in 500 ml. of isopropyl alcohol and 10–12 ml. of water and filtered. After chilling for 24 hours, the crystalline product was collected and dried. The melting point of the substance was 147–151° C. with decomposition.

The compound analyzed for a salt of the composition $C_{12}H_{17}ON_4S \cdot C_7H_5O_4 \cdot C_7H_6O_4 \cdot H_2O$, that is, vitamin B₁ gentisate with one molecule of water of crystallization, or 4-methyl-5-($\beta$-hydroxy-ethyl) - N - {[2 - methyl - 4 - amino - pyrimidyl-(5)] - methyl} - thiazolium - gentisate - gentisate, which is a new compound.

I claim:

4 - methyl - 5 - ($\beta$ - hydroxy - ethyl) - N-{[2 - methyl - 4 - amino - pyrimidyl - (5)]-methyl}-thiazolium-gentisate-gentisate.

BENJAMIN PECHERER.

References Cited in the file of this patent

UNITED STATES PATENTS

| Number | Name | Date |
|---|---|---|
| 2,151,883 | Adams et al. | Mar. 28, 1939 |
| 2,198,874 | Holmes et al. | Apr. 30, 1940 |
| 2,328,594 | Williams | Sept. 7, 1943 |
| 2,330,239 | Prutton | Sept. 28, 1943 |
| 2,443,485 | Waksman et al. | June 15, 1948 |

FOREIGN PATENTS

| Number | Country | Date |
|---|---|---|
| 805,092 | France | Nov. 10, 1936 |

OTHER REFERENCES

Appelzweig, J. Am. Chem. Soc., 66, 1990 (1944).

Appelzweig, et al., Ind. and Eng. Chem., 38, pp. 576–579 (1946).

Myers, Ind. and Eng. Chem., 35, pp. 858–863 (1943).